No. 683,917. Patented Oct. 8, 1901.
W. H. ECCLESTON.
FASTENER FOR EYEGLASSES.
(Application filed Sept. 13, 1900.)
(No Model.)
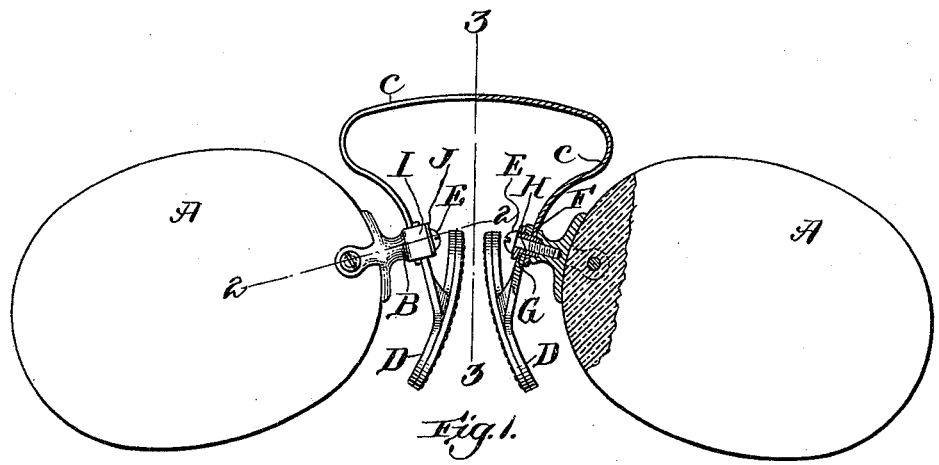
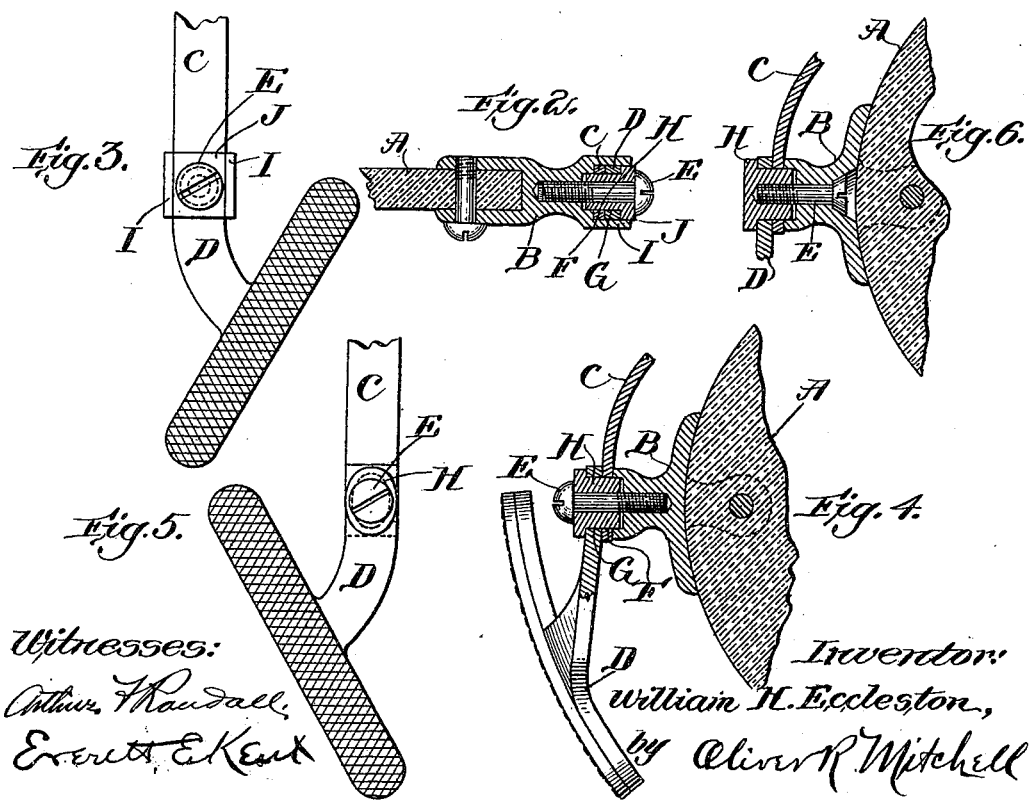
Witnesses:
Arthur F. Randall
Everett E. Kent
Inventor:
William H. Eccleston,
by Oliver R. Mitchell
Attorney

UNITED STATES PATENT OFFICE.

WILLIAM H. ECCLESTON, OF SOUTHBRIDGE, MASSACHUSETTS.

FASTENER FOR EYEGLASSES.

SPECIFICATION forming part of Letters Patent No. 683,917, dated October 8, 1901.

Application filed September 13, 1900. Serial No. 29,864. (No model.)

*To all whom it may concern:*

Be it known that I, WILLIAM H. ECCLESTON, of Southbridge, county of Worcester, State of Massachusetts, have invented a new and useful Improvement in Fasteners for Eyeglasses, of which the following is a specification.

My invention relates more particularly to means for clamping or securing together in their proper positions the lenses, the spring, and the nose-guards of eyeglasses; and it consists of the device shown in the accompanying drawings, in which—

Figure 1 is an enlarged front elevation of a pair of eyeglasses fitted with my improved fastener, partly in section. Fig. 2 is a horizontal sectional view on the line 2 2 of Fig. 1, enlarged. Fig. 3 shows one fastener as seen from the line 3 3 of Fig. 1 viewed from the right, enlarged. Fig. 4 is a front elevation of a modification of my improvement, enlarged and shown in section. Fig. 5 is an end view of the modification shown in Fig. 4. Fig. 6 is a front elevation in section of the modification shown in Fig. 4 applied in a different way.

The object of my invention is to provide means by which the lenses, nose-guards, and spring may be secured and positively locked in their proper positions relative to one another.

In eyeglasses as hitherto made it has been usual to fasten the parts together by a binding-screw passing through the stem of the nose-guard and one end of the spring into a post mounted on the lens-frame or on the lens itself. Very often this binding-screw works loose with use of the glasses, no matter how tight it may originally have been set, causing the wearer the inconvenience of being obliged frequently to resort to an optician to tighten it and sometimes when not corrected soon enough causing breakage or loss of a lens. Prior to my invention, so far as I am aware, no one has succeeded in devising a positive locking device that would stand the test of use and wear and hold the parts positively locked until they are separated by the exercise of human intelligence. By the device shown in the drawings and described in this specification that much-desired result may be accomplished.

Referring to the drawings, A is a lens in a pair of eyeglasses. B is a binding-post mounted thereon.

C is the spring joining the lenses.

D is a nose-guard, and E is a binding-screw passing into the post B and passing also through a hole F in the spring and a hole G in the stem of the nose-guard. Fitted loosely upon and surrounding the screw and passing with it through the holes F and G is a thimble H. The threaded hole in the post B, where the screw E enters, is countersunk to permit the entrance of the thimble a short distance with endwise clearance. The holes F and G are of such size that the thimble will fit them. The post B has an enlargement at its outer end containing a comparatively deep and broad recess set vertically, the walls of which are marked I in the drawings, the recess being adapted to form a binding-seat for the ends of the spring and nose-guard stem when they are in position, the sides or walls of the recess preventing them from rotating upon the thimble. The outer end of the thimble is enlarged to form a head J, which may be square in shape and which is equivalent to a lug, so that the thimble also when seated in position in the recess is prevented from rotating by the sides I of the recess.

The parts are so proportioned that when they are assembled by mounting the thimble upon the screw and the nose-guard and spring upon the thimble and then inserting and tightening the screw in the post the whole will be clamped between the head of the thimble and the binding-seat of the post, the extremity of the head on the thimble being about flush with the extremity of the post and all but the screw being prevented from rotating by the sides of the recess.

In practice the spring and the nose-guard stem will sometimes be a little narrower than the recess or may fit loosely about the thimble; but this will not interfere with the successful working of the device, the essential feature of which is the separation of the screw from the spring and nose-guard stem, so that there is not direct contact between it and them, and the locking of the separating part, so that it cannot rotate.

It will be obvious that there are ways other than that shown in Figs. 1, 2, and 3, but acting on the same principle, of accomplishing the same result. One of these is shown in Figs. 4 and 5, which illustrate a modification of my invention. In this modification the thimble is made elliptical in exterior shape and is adapted to fit and pass through elliptical-shaped holes in the spring and nose-guard stem. The hole countersunk in the post to receive the thimble is shaped to fit the thimble. When the parts are in position, tightening the screw E causes the spring and the nose-guard stem to be clamped between the post B and the flanged head of the thimble. All parts are prevented from rotating by the non-circular shape of the thimble and its seat in the post.

In the drawings my invention is shown as applied to rimless lenses. I do not, however, limit myself to that form, for it is obvious that the invention is equally applicable to lenses inclosed in rims. So, also, my invention is equally applicable to binding-posts in which the screw is inserted in a direction toward the lens and those in which it is inserted from the base or lensward side.

In Fig. 6 I show the last-described modification of my invention applied to a fastener in which the screw passes through the post from the lensward side and screws into the thimble. When made in this form, it is best to countersink the binding-post to receive the head of the screw deeply enough, so that there is no chance of the lens working or rubbing against the screw-head in case the lens should get loose from the post. This is because the lens, which normally performs no function in connection with my fastener, might, if it should get loose and should come in contact with the screw-head, work upon the screw-head so as to loosen the screw. If the lens does not come into contact with the screw-head, the screw will remain firm and tight in position and cannot of itself work loose. This form has the advantage of being both compact and strong, the depth of the thimble giving a long purchase for the binding-screw where it enters the thimble.

I claim—

1. The frame for an eyeglass, consisting of a binding-post adapted to be connected to the lens, and having a longitudinal aperture to receive the binding-screw; that binding-screw; a bow; a thimble mounted upon the binding-screw and interposed between the binding-screw and the edges of the aperture in the bow, substantially as described.

2. The frame for an eyeglass, consisting of a binding-post adapted to be secured to the lens, and having a longitudinal aperture to receive the binding-screw; that binding-screw; a bow; a thimble mounted upon the binding-screw between the binding-screw and the edges of the aperture in the end of the bow, and means to secure the thimble to the binding-post, to prevent rotation of the thimble, substantially as described.

3. A fastener for eyeglasses, consisting of a binding-post adapted to be secured to the lens, and having a longitudinal aperture to receive the binding-screw and a transverse aperture to receive the head of the thimble; the thimble, mounted upon the binding-screw, and having a non-circular head one cross dimension of which is greater than the transverse aperture, and having also a projection adapted to pass through an aperture in the end of the bow, so that the projection is interposed between the bow and the screw when the parts are assembled, substantially as described.

4. A binding-post having means for attaching it to the lens, a longitudinal aperture to receive the binding-screw, a countersink about such longitudinal aperture and a clamping-surface adjacent to said countersink; a binding-screw and a thimble mounted upon the binding-screw and fitting into the countersink, said thimble being provided on its exterior with a clamping-surface to coöperate with that of the binding-post, substantially as and for the purpose set forth.

WILLIAM H. ECCLESTON.

Witnesses:
H. T. HYDE,
H. P. COLBURN.